US008465051B2

(12) United States Patent
Ha et al.

(10) Patent No.: US 8,465,051 B2
(45) Date of Patent: Jun. 18, 2013

(54) DRIVER KNEE BOLSTER OF AUTOMOBILE

(75) Inventors: Hyun Peal Ha, Hwaseong-si (KR);
Hong Min Choi, Hwaseong-si (KR);
Jong Yoon Lee, Seoul (KR); Jung Yoon Jang, Incheon (KR); Yong Kwan Jeon, Hwaseong-si (KR); Jeong Han Kim, Yongin-si (KR)

(73) Assignee: Kia Motors Corporation, Seoul (KR)

(*) Notice: Subject to any disclaimer, the term of this patent is extended or adjusted under 35 U.S.C. 154(b) by 136 days.

(21) Appl. No.: 12/954,384

(22) Filed: Nov. 24, 2010

(65) Prior Publication Data

US 2012/0032430 A1 Feb. 9, 2012

(30) Foreign Application Priority Data

Aug. 4, 2010 (KR) .................. 10-2010-0075269

(51) Int. Cl.
*B60R 21/045* (2006.01)

(52) U.S. Cl.
USPC ............................................ 280/752; 280/751

(58) Field of Classification Search
USPC ............................................ 280/750, 751, 752
See application file for complete search history.

(56) References Cited

U.S. PATENT DOCUMENTS

| | | | | | |
|---|---|---|---|---|---|
| 5,037,130 | A | * | 8/1991 | Okuyama | 280/752 |
| 5,238,286 | A | * | 8/1993 | Tanaka et al. | 296/70 |
| 5,577,770 | A | * | 11/1996 | Sinner et al. | 280/752 |
| 6,145,880 | A | | 11/2000 | White et al. | |
| 6,609,727 | B2 | | 8/2003 | Figlioli et al. | |
| 6,702,324 | B2 | * | 3/2004 | Shimoyamada et al. | 280/752 |
| 6,837,518 | B2 | * | 1/2005 | Mullan | 280/752 |
| 6,869,123 | B2 | * | 3/2005 | Marks et al. | 296/70 |
| 7,293,800 | B2 | * | 11/2007 | Abe et al. | 280/751 |
| 7,431,338 | B2 | * | 10/2008 | Hayata | 280/752 |
| 7,584,995 | B2 | * | 9/2009 | Iwasaki et al. | 280/753 |
| 7,832,764 | B2 | * | 11/2010 | Kawashima et al. | 280/751 |
| 7,850,198 | B2 | * | 12/2010 | Hayakawa et al. | 280/730.1 |
| 8,333,407 | B2 | * | 12/2012 | An | 280/752 |
| 2004/0056463 | A1 | * | 3/2004 | Marks et al. | 280/752 |
| 2005/0001416 | A1 | * | 1/2005 | Muramatsu et al. | 280/752 |
| 2007/0164548 | A1 | * | 7/2007 | Abe et al. | 280/752 |
| 2007/0222197 | A1 | * | 9/2007 | Makita et al. | 280/752 |
| 2008/0007039 | A1 | * | 1/2008 | Iwasaki et al. | 280/752 |
| 2008/0048425 | A1 | * | 2/2008 | Hayata | 280/751 |
| 2009/0146405 | A1 | * | 6/2009 | Kawashima et al. | 280/751 |
| 2012/0068447 | A1 | * | 3/2012 | An | 280/752 |
| 2012/0228856 | A1 | * | 9/2012 | Arima | 280/751 |

FOREIGN PATENT DOCUMENTS

| | | |
|---|---|---|
| JP | 7-179158 A | 7/1995 |
| JP | 2003-327066 A | 11/2003 |
| JP | 2007-176447 A | 7/2007 |
| KR | 0151666 B1 | 10/1998 |
| KR | 10-2004-0042710 A | 5/2004 |
| KR | 10-2006-0070087 A | 6/2006 |

* cited by examiner

*Primary Examiner* — Paul N Dickson
*Assistant Examiner* — Barry Gooden, Jr.
(74) *Attorney, Agent, or Firm* — Morgan, Lewis & Bockius LLP

(57) ABSTRACT

A driver knee bolster may include a first bracket arranged on a cowl crossbar, wherein an upper portion may be fixed to the cowl crossbar, a second bracket disposed in front of the first bracket, wherein a lower portion of the second bracket may be coupled to a lower portion of the first bracket, and an upper portion of the second bracket may be spaced apart from the upper portion of the first bracket to form a space therebetween, and a buffering member arranged in the space formed between the first and second brackets.

9 Claims, 3 Drawing Sheets

DRIVER KNEE BOLSTER OF AUTOMOBILE

CROSS REFERENCE TO RELATED APPLICATION

The present application claims priority to Korean Patent Application Number 10-2010-0075269 filed on Aug. 4, 2010, the entire contents of which application are incorporated herein for all purposes by this reference.

BACKGROUND OF THE INVENTION

1. Field of the Invention

The present invention relates to a driver knee bolster and, more particularly, to a driver knee bolster, which is provided in a position with which a driver's knee is brought into contact in the event of a collision of a vehicle.

2. Description of Related Art

A driver knee bolster is a structure that is provided at a position at which a driver's knee is brought into contact in the event of a collision of a vehicle in order to prevent the knee from moving and to absorb impact applied to the knee, thereby protecting the knee.

A driver knee bolster of the related art is provided as a pair of frames, in which both the upper end and the lower end are generally coupled to a cowl crossbar. Such a driver knee bolster can solve the problem in which the knee is pushed based on the rigidity of the frames, but still has a problem in that it is impossible to alleviate the impact transferred to the knee by absorbing it.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a driver knee bolster that achieves the following objects.

First, the driver knee bolster prevents a driver's knee from being pushed in the early stage of a collision of a vehicle.

Second, the driver knee bolster absorbs impact applied to the knee in the latter stage of the collision, thereby minimizing damage to the knee.

Third, a rigid structure, which can be easily deformed, is provided in a buffering member, which absorbs impact applied to the knee after the collision of the vehicle, in order to prevent the driver's knee from being pushed in the early stage of the collision and absorb the impact applied to the knee in the latter stage of the collision.

Fourth, the buffering member is designed to be easily installed.

The present invention is not limited to the above-described objects, but other objects will be apparent to those skilled in the art from the following disclosure.

In an aspect of the present invention, the driver knee bolster may include a first bracket arranged on a cowl crossbar, wherein an upper portion may be fixed to the cowl crossbar, a second bracket disposed in front of the first bracket, wherein a lower portion of the second bracket may be coupled to a lower portion of the first bracket, and an upper portion of the second bracket may be spaced apart from the upper portion of the first bracket to form a space therebetween, and a buffering member arranged in the space formed between the first and second brackets.

The upper portion of the second bracket may be bent toward the first bracket with a predetermined angle from the lower portion thereof.

The first bracket may have a protrusion protruding in a direction opposite the second bracket, the protrusion spaced apart from a lower portion of the cowl crossbar, wherein a portion of the buffering member may be seated between the protrusion of the first bracket and the lower portion of the first bracket, and the other portion of the buffering member may be seated on the upper portion of the second bracket.

The first bracket may include a lower protrusion spaced downward from the protrusion and protruding in the direction toward the second bracket to support the buffering member.

The second bracket may have a recess in the upper portion thereof into which the buffering member may be fitted. The driver knee bolster may further include a buffering member frame arranged on a circumferential portion of the buffering member, wherein an upper portion of the buffering member frame may be open, wherein the first bracket may have a protrusion protruding in a direction opposite the second bracket, the protrusion spaced apart from a lower portion of the cowl crossbar, and wherein a portion of the buffering member frame may be seated between the protrusion of the first bracket and the lower portion of the first bracket, and the other portion of the buffering member frame may be seated in the recess formed on the upper portion of the second bracket, and wherein the first bracket may include a lower protrusion spaced downward from the protrusion and protruding in the direction toward the second bracket.

In another aspect of the present invention, a pair of the first brackets and a pair of the second brackets may be arranged on the cowl crossbar, the first brackets spaced apart from each other, the second brackets spaced apart from each other, and wherein the buffering member may be arranged between the first and second brackets, and wherein a connector bracket may be connected to lower portions of the spaced second brackets, which may be apart from each other.

As set forth above, since the driver knee bolster is configured such that the upper section is open, the driver's knee is not pushed in the early stage of the collision of the vehicle. In addition, the buffering member arranged in the open structure can absorb impact applied to the knee in the latter stage of the collision. Furthermore, the easily-deformable frame can be installed in the buffering member in order to provide suitable rigidity and impact-absorbing capability in the early and latter stages of the collision. The frame of the buffering member can also make it easy to install the buffering member.

The present invention is not limited to the above-described effects, but other effects will be apparent to those skilled in the art from the following disclosure.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
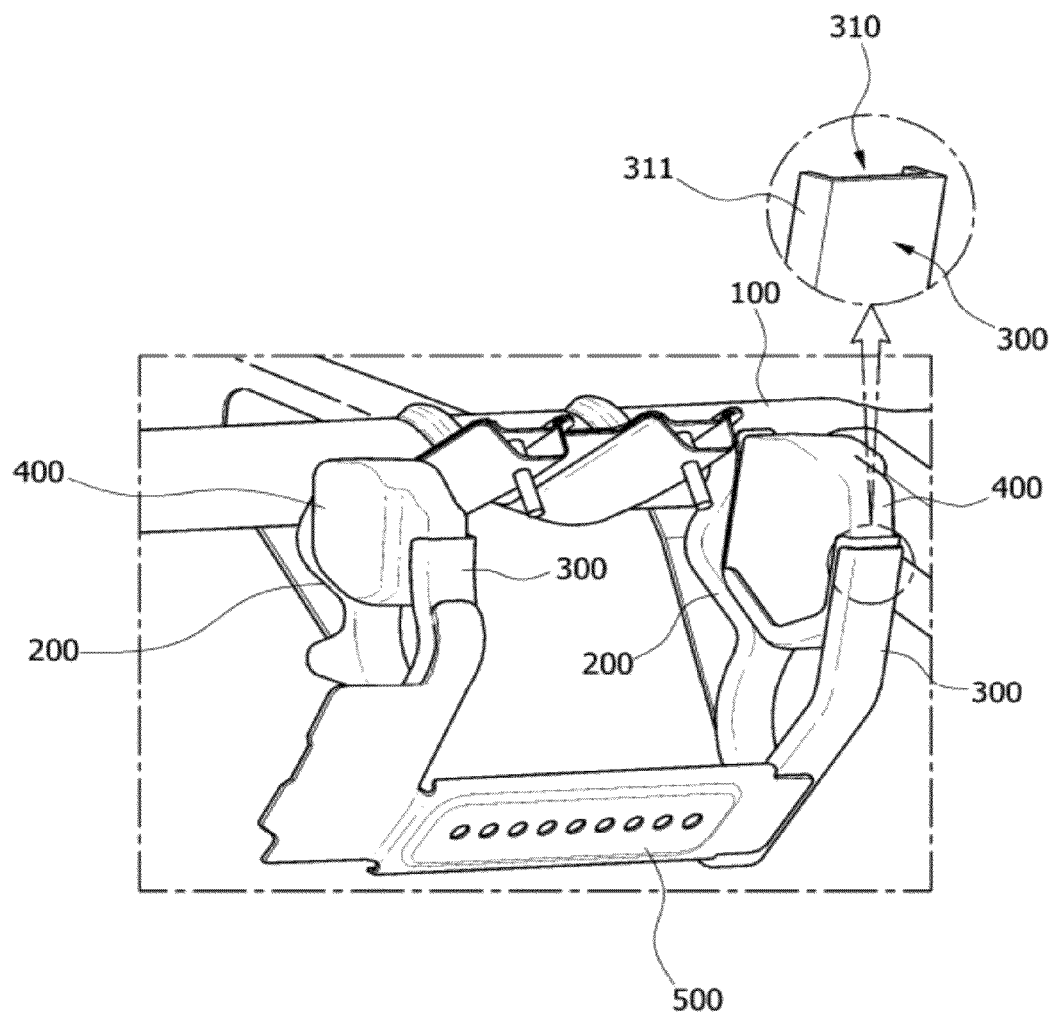
FIG. 1 is a perspective view showing a driver knee bolster according to an exemplary embodiment of the invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
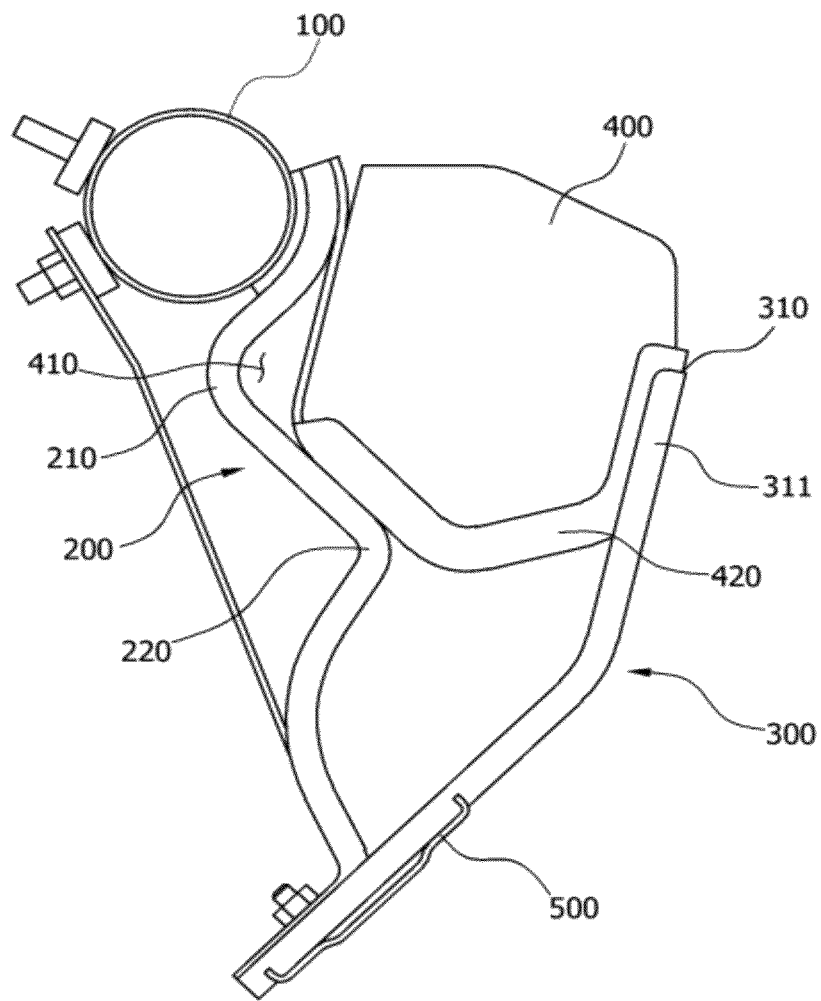
FIG. 2 is a cross-sectional view of the driver knee bolster shown in FIG. 1.

FIG. 1 is a perspective view showing a driver knee bolster according to an exemplary embodiment of the invention, and FIG. 2 is a cross-sectional view of the driver knee bolster shown in FIG. 1.

As shown in FIG. 1, the driver knee bolster of the present exemplary embodiment includes a cowl crossbar 100, first brackets 200, second brackets 300, and buffering members 400.

As shown in FIGS. 1 and 2, the first brackets 200 are arranged on the cowl crossbar 100. Here, the upper portion of each first bracket 200 is fixed to the cowl crossbar 100, and the lower portion of each first bracket 200 extends downward from the cowl crossbar 100.

Each of the second brackets 300 is arranged in a position opposite the cowl crossbar 100 about the first bracket 200 so that the driver's knee can come into contact with the second bracket 300.

Here, it is preferred that the lower section of the second bracket 300 be coupled with the lower section of the first bracket 200 so that the upper sections of the second bracket 300 can be spaced apart from the first bracket 200.

Accordingly, when the driver's knee is brought into contact with the second bracket 300 in the event of a collision of a vehicle, the driver's knee can be supported by the second bracket 300.

The buffering members 400 serve to absorb impact applied to the driver's knee in the event of a collision of a vehicle, and are arranged in a space 410 between the first and second brackets 200 and 300.

When the upper section of the second bracket 300, designed to come into contact with the driver's knee in the event of a collision of a vehicle, is moved in the direction toward the first bracket 200, the buffering members 400 are deformed to absorb the impact.

The driver knee bolster of the present exemplary embodiment having the above-described structure has effects of preventing the driver's knee from being pushed in the early stage of the collision of the vehicle while absorbing the impact applied to the knee in the latter stage of the collision of the vehicle.

In the driver knee bolster of this exemplary embodiment, it is preferred that the second bracket 300 has a recess 310 in the upper section thereof into which the buffering member 400 can be fitted.

As shown in FIG. 2, two bent sections 311 are provided on opposite ends of the upper section of the second bracket 300 by being bent in the direction toward the first bracket 200, and the two bent sections 311 form one recess 310 between them, so that the buffering member 400 can be fitted into the recess 310.

As shown in FIGS. 1 and 2, the buffering member 400 can be easily fitted into and coupled with the recess 310 of the second bracket 300. Accordingly, this configuration makes it easy to assemble the driver knee bolster.

A buffering member frame 420 having an open upper portion is arranged on the circumference of the buffering member 400 of the driver knee bolster of this exemplary embodiment.

It is not easy to install the buffering member 420 directly on the second frame 300, since the buffering member 420 is made of a soft material which that is easily deformable in response to external force in order to absorb impact. Therefore, as shown in FIGS. 1 and 2, it is preferred that the buffering member frame 420 be installed on the circumference of the buffering member 400.

Although the buffering member frame 420 can be formed to entirely surround the circumference of the buffering member 400, the buffering member 400 cannot more efficiently absorb external impact in this case.

Therefore, it is preferred that the buffering member frame 420 be formed as shown in FIGS. 1 and 2, so that the upper portion thereof can be opened. In the event of a collision of a vehicle, the buffering member frame 420 can be deformed first, and then the buffering member 400 can be deformed.

In the driver knee bolster of this exemplary embodiment, the first bracket 200 has a protrusion 210 that is spaced apart from the lower portion of the cowl crossbar 100 and protrudes in the direction opposite the second bracket 300. Preferably, one portion of the buffering member frame 420 can be seated between the protrusion 210 and the lower section of the first bracket 200.

As shown in FIGS. 1 and 2, when the protrusion 210 protruding in the direction toward the cowl crossbar 100 is formed in a position spaced apart from the cowl crossbar 100, a wider space 410 is formed between the upper section of the first bracket 200 and the upper section of the second bracket 300. This, as a result, can provide a wider space, in which the bracket 300 can be deformed in the event of a collision of a vehicle.

In this case, one portion of the buffering member frame 420 as described above (the lower left section of the buffering member when viewed in FIG. 2) is seated on one portion of the first bracket 200, which is below the protrusion 210 of the first bracket 200, and the other portion of the buffering member frame 420 is seated on one portion of the upper section of the second bracket 300.

In addition, the first bracket 200 of the driver knee bolster of the present exemplary embodiment can also have a lower protrusion 220, which is spaced downward from the above-described protrusion 210 and protrudes in the direction toward the second bracket 300. The lower protrusion 220 makes it possible to couple the lower section of the first bracket 200 with the second bracket 300 by moving it in the direction toward the cowl crossbar 100, thereby providing an advantage in that the space 410 between the first and second brackets 200 and 300 can be further expanded.

The driver knee bolster of the present exemplary embodiment can include a pair of the first brackets 200 arranged on the cowl crossbar 100, the first brackets 200 spaced apart from each other, the second brackets 300 each coupled with a respective first bracket 200, and the buffering members 400 each arranged between a respective first bracket 200 and a respective second bracket 300. Here, a connector bracket 500 is provided to connect the second brackets 300 to each other, so that the driver's knee can be brought into contact with a wider area.

Figure 3:
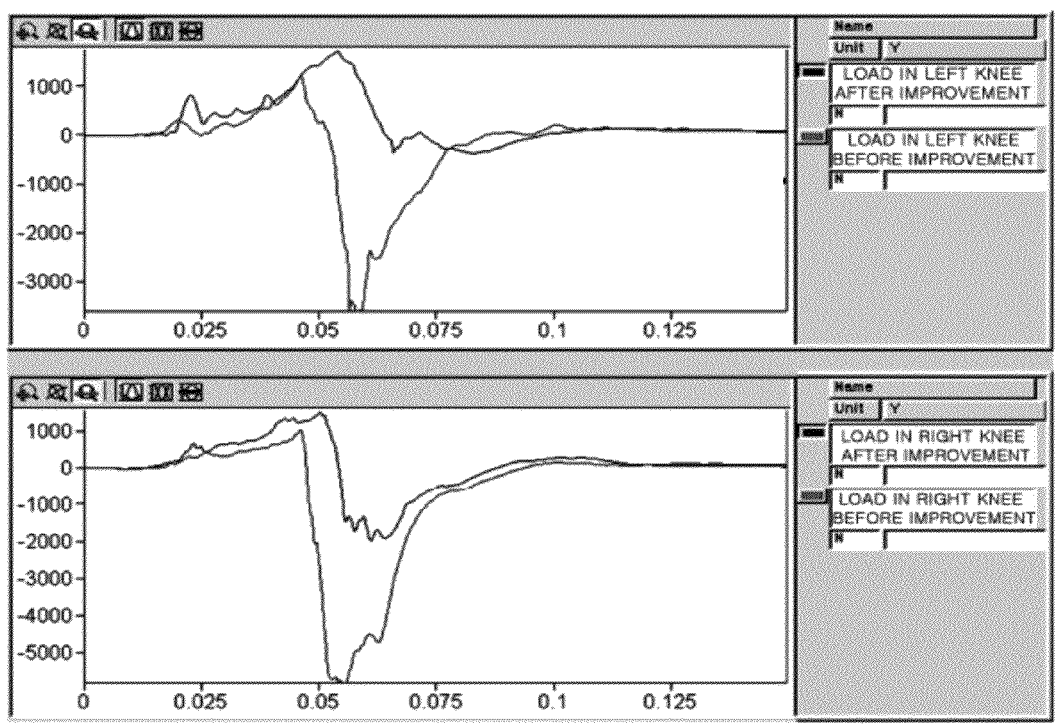
FIG. 3 is comparison graphs showing the amounts of load applied to a driver's knee from the driver knee bolster of the invention and a driver knee bolster of the related art when impact is applied thereto.

FIG. 3 is comparison graphs showing the amounts of load applied to a driver's knee from the driver knee bolster of the invention and a driver knee bolster in which the upper and lower sections of the first and second brackets 200 and 300 are coupled with each other (hereinafter, referred to as "a driver knee bolster of the related art") in the event of a front collision of a vehicle.

The graphs shown in FIG. 3 shows the load applied to the driver's knee with time, in the event of a front collision of a vehicle at a velocity of 56 kn/h.

The upper graph shows the load applied to the left knee of the driver, and the lower graph shows the load applied to the right knee of the driver.

As shown in the upper graph of FIG. 3, in the driver knee bolster of the related art, it can be understood that the load applied to the left knee of the driver is 3617 N when about 0.05 second has elapsed after the collision. In the driver knee bolster of the invention, it can be understood that the load of bout 1731 N is applied to the left knee of the driver when the same time has elapsed. Therefore, it is apparent that the driver knee bolster of the invention exhibits an improvement in the load by about 50% compared to the driver knee bolster of the related art.

In addition, examining the load applied to the right knee of the driver in the event of the collision with reference to the lower graph of FIG. 4, it can be understood that the driver knee bolster of the related art applies a load of about 5792 N to the driver's knee when about 0.05 second has elapsed after the collision, whereas the driver knee bolster of the invention applies a load of about 1960 N to the driver's knee when the same time has elapsed. Therefore, it is apparent that the driver knee bolster of the invention exhibits an improvement in the load by about 66% compared to the driver knee bolster of the related art.

Based on such comparison graphs, it can be understood that the driver knee bolster of the invention has better performance than that of the driver knee bolster of the related art.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A driver knee bolster comprising:
   a first bracket arranged on a cowl crossbar, wherein an upper portion is fixed to the cowl crossbar;
   a second bracket disposed in front of the first bracket, wherein a lower portion of the second bracket is coupled to a lower portion of the first bracket and an upper portion of the second bracket is spaced apart from the upper portion of the first bracket to form a space therebetween; and
   a buffering member arranged in the space formed between the first bracket and the second bracket,
   wherein the second bracket has a recess in the upper portion thereof into which the buffering member is fitted.

2. A driver knee bolster comprising:
   a first bracket arranged on a cowl crossbar, wherein an upper portion is fixed to the cowl crossbar;
   a second bracket disposed in front of the first bracket, wherein a lower portion of the second bracket is coupled to a lower portion of the first bracket, and an upper portion of the second bracket is spaced apart from the upper portion of the first bracket to form a space therebetween;
   a buffering member arranged in the space formed between the first bracket and the second bracket; wherein the second bracket has a recess in the upper portion thereof into which the buffering member is fitted; and
   a buffering member frame arranged on a circumferential portion of the buffering member.

3. The driver knee bolster according to claim 2, wherein the upper portion of the second bracket is bent toward the first bracket with a predetermined angle from the lower portion thereof.

4. The driver knee bolster according to claim 2, wherein the first bracket has a protrusion protruding in a direction opposite the second bracket, the protrusion spaced apart from a lower portion of the cowl crossbar, and
   wherein a portion of the buffering member is seated between the protrusion of the first bracket and the lower portion of the first bracket, and an other portion of the buffering member is seated on the upper portion of the second bracket.

5. The driver knee bolster according to claim 2, wherein a pair of the first brackets, a pair of the second brackets, and a pair of the buffering members are arranged on the cowl crossbar, the pair of the first brackets spaced apart from each other, the pair of the second brackets spaced apart from each other, and wherein each of said buffering members is arranged between a set of the first and the second brackets, and wherein a connector bracket is connected to the lower portions of the second brackets, which are spaced apart from each other.

6. The driver knee bolster according to claim 2, wherein an upper portion of the buffering member frame is open.

7. The driver knee bolster according to claim 6, wherein the first bracket has a protrusion protruding in a direction opposite the second bracket, the protrusion spaced apart from a lower portion of the cowl crossbar, and
   wherein a portion of the buffering member frame is seated between the protrusion of the first bracket and the lower portion of the first bracket, and an other portion of the buffering member frame is seated in the recess formed on the upper portion of the second bracket.

8. The driver knee bolster according to claim 7, wherein the first bracket includes a lower protrusion spaced downward from the protrusion and protruding in a direction toward the second bracket.

9. A driver knee bolster comprising:

a first bracket arranged on a cowl crossbar, wherein an upper portion is fixed to the cowl crossbar;

a second bracket disposed in front of the first bracket, wherein a lower portion of the second bracket is coupled to a lower portion of the first bracket, and an upper portion of the second bracket is spaced apart from the upper portion of the first bracket to form a space therebetween; and a buffering member arranged in the space formed between the first bracket and the second bracket;

wherein the first bracket has a protrusion protruding in a direction opposite the second bracket, the protrusion spaced apart from a lower portion of the cowl crossbar;

wherein a portion of the buffering member is seated between the protrusion of the first bracket and the lower portion of the first bracket, and an other portion of the buffering member is seated on the upper portion of the second bracket; and wherein the first bracket includes a lower protrusion spaced downward from the protrusion and protruding in a direction toward the second bracket to support the buffering member.

\* \* \* \* \*